United States Patent Office 3,687,846
Patented Aug. 29, 1972

3,687,846
HIGH YIELD BENTONITES
William J. Lang, Libertyville, Ill., assignor to International Minerals & Chemical Corporation
No Drawing. Filed June 2, 1970, Ser. No. 42,889
Int. Cl. C10m 3/22
U.S. Cl. 252—8.5 A                17 Claims

ABSTRACT OF THE DISCLOSURE

The properties of bentonite are enhanced for use in aqueous suspensions by intimately mixing with the clay minor amounts of a water-soluble polymer containing carboxyl groups or salt thereof (e.g., a water-soluble polyacrylic acid or salt thereof) or a polymer on which carboxyl groups are formed in water, and a water-soluble polyalkylene oxide.

BACKGROUND OF THE INVENTION

This invention relates to the modification of bentonite clays, and more particularly, to the enhancement of the properties of bentonite for use in aqueous suspensions. Still more particularly, this invention relates to an improvement in the degree of enhancement of the properties of bentonite for use in aqueous suspensions that is normally obtained by utilizing carboxyl-containing polymers or salts thereof in combination with clay-treating materials of the prior art.

Clays having a micaceous or platey structure such as bentonite clays possess the properties of self-suspension, swelling and gelatinizing when mixed with water. These clays are advantageously used in many industries in view of their unique properties. For example, they find use in the well drilling industry as a component of drilling muds of widely varying composition. The drilling fluids are circulated in wells being drilled by the rotary process to provide lubrication during the drilling operation, carry the cuttings out of the well bore, provide a substantially impervious lining along the walls of the bore hole so as to prevent the loss of the drilling fluid into the formation, and a number of other purposes.

The clays that are most suitable for drilling fluids are of two general types: Western or natural sodium bentonitic clays and native or sub-bentonitic clays. The determining factor, so far as the use of a clay in the preparation of a drilling mud is concerned, is the yield value, i.e., the number of barrels of an aqueous dispersion or mud having a viscosity of 15 centipoises which can be prepared from a ton of clay. The Western and sub-bentonitic clays exhibit different yield characteristics, apparently due to differences in their chemical compositions. A yield of anywhere from about 40 to 100 barrels is obtainable with the Western bentonitic clays, which are natural sodium clays. These clays are sometimes hereinafter referred to as merely "bentonitic" clays. Sub-bentonitic clays are generally calcium or magnesium varieties of montmorillonite, but may contain substantial portions of non-clay or non-montmorillonite impurities. These clays only produce from about 25 to 60 barrels yield.

There is a need for increasing the yields obtainable from both the low yield bentonitic clays and the sub-bentonitic clays so as to increase their utility in mud-making and to make them competitive with Western bentonite. There are also distinct advantages to be obtained in further up-grading sodium bentonites to produce the so-called "high-yield" clays.

A number of different types of polymers have been suggested for up-grading clays for use in drilling muds. Examples of polymers which have been suggested for enhancing clays for use in drilling muds are a water-soluble inter-polymer of maleic anhydride, an olefin having from 2 to 4 carbon atoms, and hexadiene-1,5 (U.S. Pat. No. 3,216,934), acrylate-acrylamide copolymers (U.S. Pats. Nos. 3,323,603 and 3,360,461), and the sodium salt of polyacrylic acid in combination with soda ash (U.S. Pat. No. 2,702,788).

One obvious advantage resulting from the up-grading of clays for well drilling purposes, such as by the use of polymers as hereinbefore described, is a reduction in drilling cost. Great economies can be effected, for example, if the yield can be doubled so that only half the amount of clay is required to prepare a given quantity of high quality drilling fluid. A mud of low solids content has the further advantage of allowing faster drilling rates so as to appreciably lower the cost of drilling a well. Although high yields are important during drilling, it is equally important for drilling muds used in water drilling operations to be readily thinned so that they can be removed from the bore hole after the drilling operation without leaving clay to block the water-yielding formation.

Aqueous suspensions of clays such as bentonite are used in industries other than the well drilling industry, but for many of the same properties the clays are used in drilling muds. An exampe of a related use of clay suspensions is in the so-called "slurry trenching." A bentonite slurry is pumped into a trench as it is dug to prevent the side walls of the trench from caving in or collapsing without the use of timbering, cribbing or the like, and to seal the side walls of the trench. Concrete may be tremied into the trench so as to displace the slurry which then flows out at the trench surface. This process is described in detail in U.S. Pat. No. 2,757,514 of Wyatt.

There are obvious modifications other than cost reduction to be gained by the up-grading of clay used in slurry trenching. One significant advantage is that the use of an up-graded clay will give the desirable high viscosity of the suspension at a relatively low slurry density. The maintenance of a suspension of the lowest possible slurry density will permit the dragline bucket used in the excavation to drop to the bottom of the trench at a relatively quick rate so that it may take a good bite of the soil for the next bucket-full to be removed. A relatively low bulk density will also result in an increase in the rate at which concrete may be tremied into the trench since a suspension of low bulk density is more easily displaced by the concrete than one of relatively high bulk density.

SUMMARY OF THE INVENTION

This invention is based on the discovery that the improvement in the properties of a bentonite clay for many varied commercial uses of the clay, such as for use in aqueous suspensions, that is normally obtained by using a minor amount of a water-soluble polycarboxyl-containing polymeric material or salt thereof, including polymers on which carboxyl groups are formed in water, is substantially enhanced by also using a minor amount of a water-soluble polyalkylene oxide. More specifically, it has been found that the use of up to about twenty pounds of a water-soluble polymeric material containing carboxyl groups or a salt thereof, e.g., a polyacrylic acid or a salt thereof, and up to about twenty pounds of a polyalkylene oxide, e.g., a polyethylene oxide having a molecular weight of at least about two and one-half million, per ton of bentonite clay is effective in substantially enhancing the desired properties of the clay when it is used in well drilling fluids, as well as for a number of other commercial applications of bentonite.

Generally speaking, a yield of at least 110 barrels of 12.5 centipoises mud per ton of clay is the minimum standard for clays acceptable for use in drilling muds. A yield of this magnitude can be expected with the purer forms of natural sodium bentonite. The yields of the sodium bentonite have been up-graded by the use of water-soluble polymers such as polyacrylates in view of the great economies that can be effected by increasing the yield so that only a portion of the amount of clay normally required is used. Typically, a polyacrylate-treated bentonite may reach a maximum yield of 200 to 250 barrels of 12.5 centipoises slurry. It has been found that the addition of a polyalkylene oxide in accordance with this invention is effective to increase the yield of the clay to as much as 400 barrels.

There are advantages in using the combination of water-soluble polymers in accordance with this invention other than providing superior viscosity properties by using a minimum of viscosity building solids. For example, only a minimum of mixing time and energy is required to prepare the slurries possessing excellent stability properties. In addition, the slurries prepared by using the combination of polymers are more controllable than bentonite slurries which do not incorporate the combination of polymers since the system thins more responsively to the addition of dispersants. This is particularly advantageous for slurries used in construction, e.g., slurry trenching, so that it may be necessary to thin the slurry for removal of cuttings or for disposal. The thinning of the slurry is also of importance in water well drilling since the drilling operation is followed by a flushing of all of the bentonite filter cake from the bore hole in the vicinity of the water-producing formation.

It is, therefore, a primary object of this invention to provide a clay composition of improved properties.

Another object of this invention is to provide a method for improving the properties of bentonite.

Still another object of this invention is to provide a well drilling fluid containing less bentonite than typically contained by fluids of similar viscosity.

A further object of this invention is to provide a bentonite slurry of improved properties.

A still further object of this invention is to provide a method for improving the properties of bentonite using a combination of minor amounts of a polymer containing carboxyl groups or a salt thereof, including polymers in which carboxyl groups are formed in water, and a polyalkylene oxide.

These and further objects of this invention will become apparent or be described as the description thereof herein proceeds.

DESCRIPTION OF THE PREFERRED EMBODIMENTS

Polymers which are useful as the primary clay-treating polymers for enhancing properties of clay in accordance with this invention include water-soluble polymers containing carboxyl groups and water-soluble salts thereof, such as taught by the prior art exemplified by the aforementioned patents as being useful for treating clay. Examples of materials which may be used are polymers derived from acids such as maleic acid, fumaric acid, itaconic acid and citraconic acid, especially copolymers of at least 50 mol percent of such acids with other monomers.

It will be evident to one skilled in the art that useful polymers include those polymers which do not contain carboxyl groups in the dry state, but do form carboxyl groups when dissolved in water. These polymers include those obtained by copolymerizing maleic anhydride with other monomers, such as copolymers of maleic anhydride and methyl vinyl ether (sold under the name of GANTREZ AN) and copolymers of maleic anhydride and ethylene (sold under the name of DX–840–31).

Another broad class of useful polymeric carboxyl-containing materials are acrylic-type polymers. Useful polyacrylates include polyacrylic acid and water-soluble, e.g., alkali metal and ammonium salts, of polyacrylic acid. The alkali metal and ammonium salts may be prepared by either reaction of an appropriate basic alkali metal or ammonium compound with polyacrylic acid or polymerization of the appropriate alkali metal or ammonium salts of acrylic acid. Other suitable polymers include acrylic acid, or an alkali metal or ammonium salt thereof, copolymerized with a copolymerizing monomer such as ethylene, propylene, isobutylene, styrene, vinyl formate, vinyl acetate, acrylonitrile, methacrylonitrile, vinyl chloride, vinylidene chloride, an alkyl acrylate, an alkyl methacrylate, and alkyl maleate or another olefinic monomer. Copolymers of this type having at least 50 mol percent of the acrylic acid or derivative thereof are preferred. Polymers of this type may be prepared directly by the polymerization of suitable monomers, or by the chemical reaction of other polymers, as for example, by the hydrolysis of acrylonitrile polymers and polymethacrylates.

A preferred class of acrylic-type polymers are graft copolymers prepared by graft copolymerizing acrylic acid onto a minor amount of a substrate which is a water-soluble polyhydroxyl-containing polymeric material. The amount of the substrate which is reacted with acrylic acid may vary between about 0.1 and about 10.0%, preferably between about 0.25 and about 5.0%, based on the total weight of the acrylic acid used. In general, these polymeric compounds may be characterized as having a molecular weight greater than about 350, and containing from about 5% up to about 30%, and even higher, free hydroxyl groups. The polyhydroxy polymeric compounds may contain substituents other than hydroxyl groups so long as the substituents are inert, i.e., non-reactive with the acrylic acid, under the reaction conditions. Examples of substituents other than mere hydroxyl groups which the polymeric compounds may contain are halo, alkyl, aryl, carboxyalkyl, hydroxyalkyl, halohydroxyalkyl, arylhydroxyalkyl, and the like.

The useful polymeric substrates include water-soluble polysaccharides and polyhydroxyl-containing derivatives thereof. Although disaccharides and trisacchrides may be used in accordance with this invention, the preferred polymeric compounds are the tetra-, penta- and higher polysaccharides and oligosaccharides, i.e., saccharides containing at least four linked monosaccharide molecules, and derivatives thereof containing substituents such as hereinbefore defined. The most preferred substrates include derivatives of cellulose and the biochemically-synthesized heteropolysaccharides.

One of the specific polymeric polyhydroxy compounds that may be used as substrates include, but are not limited to, water-soluble derivatives of cellulose such as methyl cellulose, chlorohydroxypropyl cellulose, phenylhydroxyethyl cellulose, hydroxybutyl cellulose, hydroxyethyl cellulose, ethyl cellulose, hydroxyethyl methyl cellulose, hydroxypropyl methyl cellulose, carboxymethyl cellulose and the like cellulose ethers. Other polymeric compounds which may be co-reacted with the acrylic acid include starch and water-soluble derivatives of starch, e.g., chlorohydroxypropyl starch, phenylhydroxyethyl starch, hydroxybutyl starch, methyl starch, ethyl starch, hydroxyethyl starch, hydroxyethyl methyl starch, hydroxypropyl metyl starch, and carboxymethyl starch. Still other polymeric materials which may be used include the so-called "sugars" such as sucrose, maltose, lactose, raffinose, stachyose and vertascose; biochemically-synthesized heteropolysaccharides, e.g., produced by the action of bacteria of the genus Xanthomonas or the genus Arthrobacter on carbohydrates; polyvinyl alcohol; and polyalkylene glycols and derivatives thereof such as alkoxy polyalkylene glycols, e.g., polyethylene glycols and methoxy polyethylene glycols. Useful compounds include those compounds which will form the above-defined polymeric compounds in the acidic reaction medium and such compounds are included in the scope of this invention. For example, the carboxymethyl cellulose will be formed from the sodium salt thereof in the acidic reaction medium.

The graft copolymerization can be carried out, as for example, in an aqueous medium by using well-known polymerization techniques. Ultraviolet light or any of the well-known peroxygen-type initiators, e.g., peroxide free radical initiators, may be used. The preferred peroxygen-type initiators are hydrogen peroxide and hydroperoxides such as t-butyl hydroperoxide, diisopropylbenzene hydroperoxide, cumene hydroperoxide, 1-phenylethyl hydroperoxide, and the like. Other useful peroxide initiators are diacyl peroxides such as benzoyl peroxide and acetyl peroxide, and dialkyl peroxides such as di-t-butyl peroxide and dicumyl peroxide. Still other useful peroxygen-type initiators include per-salts such as sodium, potassium or ammonium persulfate and sodium perborate; the peresters such as t-butyl peroxyacetate and t-butyl peroxybenzoate; and the peracids such as performic acid, peracetic acid, perbenzoic acid, and peroxylactic acid. If desired, Redox activated systems can be used in accordance with the usual polymerization practices. Thus, sodium bisulfite-potassium persulfate and hydrogen peroxide-ferrous ion systems may be employed.

The quantity of the initiator employed can be varied depending on the reaction temperature and other conditions, but will ordinarily be from about 0.0005 to about 0.01%, preferably from about 0.002 to about 0.004%, based on the weight of the acrylic acid.

The temperature of the reaction is not critical and may vary between about $-5°$ C. and about $100°$ C. The preferred temperature range is between about $40°$ C. and about $80°$ C., with a temperature between about $60°$ C. and about $70°$ C. being most preferred. The reaction may be carried out under superatmospheric pressure or even under partial vacuum. The graft copolymerization reaction is carried out in an acidic aqueous medium having a pH of any value up to and including about 3.5, preferably between about 3.0 and about 3.5. The reactants and the initiator are combined in the aqueous reaction medium in any conventional manner.

The copolymer thus produced may also be used in the form of a salt. The conversion to the salt form is generally effected by neutralization with an appropriate hydroxide. Alkali metal or ammonium salts of the copolymers such as sodium, potassium, and lithium salts may be obtained by reacting the copolymers with the corresponding hydroxide. Where complete neutralization is desired, a stoichiometric amount, and preferably a slight excess, of the hydroxide is used. Partial salts may, of course, be produced by using less than the quantity of alkali metal or ammonium hydroxide to effect complete conversion of the carboxyl groups.

Another preferred class of acrylic-type polymers is produced from methyl acrylate by emulsion polymerization and saponification. One procedure which has been found to be useful for preparing a very suitable sodium polyacrylate material comprises initially adding methyl acrylate to chilled water, e.g., at about $35°$ to $40°$ F., in a sufficient quantity to produce a 25% emulsion. Deionized water is preferably used. A suitable surfactant is also added to the water. The surfactant is added to effect emulsification of the monomer so as to sustain the polymerization reaction. An example of a suitable surfactant is an anionic surfactant sold by Antara Chemicals under the name of Alipal CO–436, which is an ammonium salt of sulfate ester of an alkylphenoxypoly(ethyleneoxy) ethanol. Other suitable surfactants include alkylaryl sulfonates, nonionic surfactants, e.g., sodium alkyl sulfates and ethoxylated isooctyl phenoxy polyethoxy ethanol, and cationic surfactants, e.g., dodecyltrimethylammonium chloride. If the water is excessively alkaline, the pH of the emulsion is raised to at least 7, preferably to about 8.0, such as by the addition of a sufficient quantity of an 80% solution of acetic acid.

A suitable peroxygen-type material is added in order to initiate the reaction. An example of a suitable initiator is a mixture of ammonium persulfate and a trace of ferrous sulfate is added. Sodium hyposulfite may also be added to form free radicals at relatively low temperatures since the initiator, e.g., ammonium persulfate, doesn't decompose to form radicals at relatively low temperatures, namely, until a temperature of $65°$ to $70°$ C. is reached.

The emulsion thus produced by the addition of the aforementioned components is slowly agitated. After the emulsion is agitated for a while, viz, about an hour, the polymerization reaction initiates and accelerates, and is then completed in about ten minutes. Upon completion of the polymerization a suitable material is added to stabilize the reaction product before it is stored. A suitable stabilizing agent is a non-ionic surfactant sold by Antara Chemicals under the trade name of Igepal CO–887, which is a 70% aqueous solution of a nonylphenoxypoly(ethyleneoxy) ethanol containing approximately 88% combined ethylene oxide based on the weight of nonylphenol. Other stabilizing agents that may be used are water-soluble gums, resins or polymer, e.g., polyvinyl alcohol and carboxymethyl cellulose.

The polymer thus produced is then converted to the salt form by the addition of an appropriate quantity of a hydroxide, e.g., alkali metal hydroxide such as sodium hydroxide. Other hydroxides such as ammonium and potassium hydroxide may also be used. Partial salts may be produced by using less than a stoichiometric quantity of the hydroxide based on the number of methyl groups. For example, if 80% saponification is desired, then a molar quantity of caustic equivalent to 80% of the quantity of methyl acrylate added is used. The hydroxide is added to the polymerized material while it is slowly agitated for a sufficient time to effect replacement of the methyl groups with sodium ions. Methyl alcohol is recovered as a by-product from the saponification.

It will be evident that a change in the molecular weight of the final polymer can be readily accomplished by changing the quantity of catalyst and reducing agent. The reaction proceeds at a faster rate to produce a lower molecular weight product as the quantities of the catalyst and reducing agent used are increased.

The acrylic-type polymers, such as those prepared in accordance with either of the hereinbefore described processes, may be dried in accordance with a number of conventional techniques and combined with the clay while in the dry form.

The water-soluble polyalkylene oxides which are used as the secondary clay-treating polymers in accordance with this invention are well known to those skilled in the art and of themselves form no part of this invention. These polymers and the methods for the preparation of the same are described in detail in Part 1 of volume XIII of "High Polymers," edited by N. G. Gaylord and published in 1963 by Interscience Publishers. The preferred materials are polyethylene oxides having a molecular weight of at least about two and one-half million, more preferably at least about four million and most preferably at least about five million.

The two types of polymers, as hereinbefore described, are combined with the clay in any desired manner. For example, a simple mechanical mixture of the clay and polymers may be prepared by dry blending the polymers in powder form with dry clay. This can be conveniently done at the time the clay is ground, as for example, in a roller mill. Alternatively, the polymers may be combined with the clay in the form of aqueous solutions that are sprayed directly onto the clay either in stock piles, after crushing, during a grinding operation or during a bag-packing operation. The polymers are preferably applied in different aqueous solutions. Also, if desired, the polymers and the clay can be separately added in any desired order to form a slurry, as at the well site in drilling mud operations and construction site in slurry trenching operations.

The polymers are combined with the clay in amounts sufficient to increase the yield of the clay. The amounts of the polymers needed depend to some extent on the degree of beneficiation desired and vary with the clay, but generally only small quantities are required. Minor amounts of polymers, i.e., amounts within the range of from about 0.1 to about 20 pounds per ton of clay for each of the two types of polymers will produce satisfactory results. Maximum yields are obtained with minimum costs by using per ton of clay from about 3 to about 10 pounds of the primary polymer, i.e., a polycarboxyl-containing polymer or salt, including polymers on which carboxyl groups are formed in water, and from about one to about 10 pounds of the secondary polymer, i.e., the polyalkylene oxide.

When the clay to be treated is a sub-bentonitic or calcium montmorillonite type of clay, the graft copolymers of this invention are employed for best results together with an alkali metal compound which is water-soluble, ionizable, and has an ion capable of reacting with calcium to form a water-insoluble precipitate. Such compounds include, as for example, alkali metal carbonates, hypophosphates, oxalates, phosphates, silicates, sulfites and tartrates. Sodium carbonate or soda ash is particularly preferred. The amount of the alkali metal compound employed will be somewhat dependent upon the proportion of calcium montmorillonite in the whole clay. In general, amounts from about 0.5% to about 7% by weight of the clay can be used. However, it is preferred to employ amounts slightly less than 7% since quantities in excess of this amount can act to reduce the yield of the clay. With soda ash, for example, preferred amounts are from about 2% to about 4% by weight, with optimum results being obtained with about 3% by weight. The clay is treated in the wet state, e.g., at a moisture level of from about 35% to about 40% in the manner well known in the clay industry to obtain a sodium-modified clay When used in aqueous suspensions such as drilling muds, the polymer-treated clay will generally be present in the amount of from about one to about 8% by weight of the suspension, but smaller and greater quantities of clay will also be useful. It will be evident that aqueous suspensions containing clay in combination with the two types of polymers in accordance with this invention may also contain other additional materials, especially when the suspensions are utilized as drilling muds. For example, drilling muds may also contain weighting agents such as barite, oil, treating chemicals such as caustic, surface active agents, and the like.

The following non-limiting examples will serve to illustrate the effectiveness of this invention for enhancing the properties of clays such as bentonites.

The polyacrylates used in the following experiments were prepared by adding 430 gallons of methyl acrylate, 3000 gallons of an ammonium salt of sulfate ester of an alkylphenoxypoly(ethyleneoxy) ethanol surfactant which is sold under the name of Alipal CO–436, 1,860 milliliters of an 80% aqueous solution of acetic acid, 800 grams of ammonium persulfate, 890 grams of sodium hydrosulfite and 62 grams of ferrous sulfate to 1,100 gallons of water at about 5 to 10° C. The emulsion polymerization mixture thus formed was slowly agitated so that the polymerization reaction initiated, and the agitation was continued until the completion of the polymerization. Upon completion of the polymerization, 270 pounds of Igepal CO–887, a 70% aqueous solution of a nonylphenoxypoly(ethyleneoxy) ethanol containing approximately 88% combined ethylene oxide based on the weight of the nonylphenol, was added to the reaction product to stabilize the same. Sodium hydroxide was finally added thereto in a molar quantity equivalent to the quantity of methyl acrylate utilized in the initial polymerization so as to achieve 100% saponification.

The polyalkylene oxide used in the following experiments is available from Union Carbide Chemicals Company under the name of Polyox, and it is a polyethylene oxide having a molecular weight of about five million.

EXAMPLE I

An experiment was conducted to demonstrate the effectiveness of using the novel combination of polymers of this invention for enhancing the properties of clays in slurries by using the combination of polymers in slurries of varying solids contents. In this experiment a polyethylene oxide sold under the name of Polyox and a polyacrylate produced as hereinbefore described were each added in the amount of six pounds per ton to slurries having solids contents of 5.5, 6.4 and 7.3 pounds per barrel. The slurries were then mixed using a Hamilton Beach Model 930 mixer as prescribed by the American Petroleum Institute Specification 13A, dated February 1969, for bentonite testing. The viscosities of the slurries were determined immediately after mixing and again after a static aging period of at least 16 hours. The aged viscosities were determined by mixing the slurries for an additional five minutes after the static aging period and then again utilizing a Fann viscosimeter to determine the viscosities at 300 r.p.m. and 600 r.p.m. The results of this test are given in Table I which follows:

TABLE I

| Bentonite content, lbs./barrel | Time of measurement | Fann reading at— | |
|---|---|---|---|
| | | 600 r.p.m. | 300 r.p.m. |
| 5.5 | Immediately | 31 | 25 |
| | After aging | 45 | 38 |
| 6.4 | Immediately | 64 | 40 |
| | After aging | 64 | 45 |
| 7.3 | Immediately | 86 | 56 |
| | After aging | 89 | 63 |

The effectiveness of the process of this invention for enhancing muds of different solids contents will be evident to one skilled in the art. For example only 5.5 pounds per barrel of bentonite treated with the combination of polymers of this invention produced a viscosity comparable to that produced by using about 10 pounds per barrel of high yield bentonite or about 22.5 pounds per barrel of normal drilling mud grade bentonite.

EXAMPLE II

This experiment was conducted to demonstrate the relative ease of dispersion and stability of a slurry produced by utilizing the combination of polymers of this invention, as well as the effectiveness of the synergistic combination of polymers of this invention. Six samples of the same bentonite were treated with the polyacrylate and polyethylene oxide in different combinations and amounts, and each sample was then added to distilled water in an amount to yield slurries having a bentonite content of 7.3 pounds per barrel. The slurries were mixed in a mixing cup using a Hamilton Beach Model 930 mixer as prescribed by the forementioned API Specification 13A except that there was a departure from the prescribed procedure since the mixing time was reduced from twenty to five minutes and a mixing r.p.m. of 3000 instead of 11,000 was used. The viscosities of the slurries were tested immediately after the mixing with a Fann viscosimeter. The slurries were then aged for twenty-four hours, remixed for one minute, and then retested to determine the stability of the slurry viscosity properties. The results of this experiment are given in Table II which follows:

TABLE II

| Polymer addition, lbs./ton of bentonite | Time of measurement | Fann reading at— | |
|---|---|---|---|
| | | 600 r.p.m. | 300 r.p.m. |
| None | Immediately | 4 | 2.5 |
| | After aging | 4 | 2.5 |
| 6 lbs. polyacrylate | Immediately | 30 | 25 |
| | After aging | 32 | 26 |
| 12 lbs. polyacrylate | Immediately | 25 | 20 |
| | After aging | 27 | 21 |
| 6 lbs. polyethylene oxide | Immediately | 7 | 4 |
| | After aging | 5 | 3 |
| 12 lbs. polyethylene oxide | Immediately | 43 | 25 |
| | After aging | 6 | 4 |
| 6 lbs. polyacrylate and 6 lbs. polyethylene oxide. | Immediately | 75 | 58 |
| | After aging | 53 | 44 |

The effectiveness of the novel combination of polymers of this invention will be evident from the data in Table II. It will be noted that the combination of polymers in accordance with this invention resulted in substantially higher viscosity properties and stability than with either of the two polymers separately. It also will be noted upon comparison with Table I of Example I that the low mixing energy and short mixing time brings out nearly the full viscosity properties that are developed after the longer term and higher shear mixing of the standard American Petroleum Institute testing.

EXAMPLE III

An experiment was conducted to determine the responsiveness to thinning of muds prepared in accordance with this invention by addition of dispersants. A seven pounds per barrel mud was prepared by utilizing 6 pounds per ton of each of the polyacrylate and polyethylene oxide. A $\frac{1}{25}$% aqueous solution of sodium acid pyrophosphate (SAPP) was added in increasing increments to different 350 milliliter quantities of the mud until the viscosity of the slurry was no longer reduced by more addition of the SAPP. The viscosities of the samples were determined by mixing the same for one minute and then utilizing a Fann viscosimeter at 600 r.p.m.

The results of this determination are given in Table III which follows:

TABLE III

| Cubic centimeters of SAPP solution: | Fann reading, 600 r.p.m. |
|---|---|
| 0 | 75 |
| 0.5 | 70 |
| 1.0 | 46 |
| 1.5 | 23 |
| 2.0 | 13 |
| 2.5 | 10 |
| 3.0 | 9 |
| 3.5 | 9 |
| 4.0 | 9 |

It will be noted from the above data that the slurry readily responded to the addition of very minor amounts of sodium acid pyrophosphate, and that the minimum viscosity was very readily obtained, i.e., at the 3.0 cubic centimeter level of the $\frac{1}{25}$% solution per 350 milliliters of slurry.

Although this invention has been described in relation to specific embodiments, it will be apparent that obvious modifications may be made by one skilled in the art without departing from the intended scope of this invention.

I claim:
1. A composition of matter consisting essentially of a bentonite clay, from about 0.1 to about 20 pounds per ton of said clay of a water-soluble primary polymer which is a bentonite-beneficiating polymer of the group consisting of $C_2$–$C_4$ olefin-maleic anhydride copolymers, polyacrylates, and methyl vinyl ether-maleic anhydride copolymers, and from about 0.1 to about 20 pounds per ton of said clay of a water-soluble polyethylene oxide secondary polymer having a molecular weight of at least two and one-half million.

2. A composition of matter in accordance with claim 1 wherein said secondary polymer is a polyethylene oxide having a molecular weight of at least four million.

3. A composition of matter in accordance with claim 2 wherein said primary polymer is a copolymer of maleic anhydride and methyl vinyl ether or ethylene.

4. A composition of matter in accordance with claim 2 containing from about 3 to about 10 pounds per ton of said clay of a polyacrylate as said primary polymer and from about one to about 10 pounds per ton of said clay of a polyethylene oxide having a molecular weight of at least five million as said secondary polymer.

5. A composition of matter in accordance with claim 4 wherein said polyacrylate is produced by an emulsion polymerization of methyl acrylate to obtain a polymer which is then saponified.

6. A composition of matter in accordance with claim 4 wherein said clay is a sub-bentonitic clay treated with from about 0.5 to about 7% by weight, based on the weight of said clay, of soda ash.

7. A composition of matter in accordance with claim 6 wherein said clay is a sub-bentonitic clay treated with from about 2 to 4% by weight, based on the weight of said clay, of soda ash.

8. A composition of matter consisting essentially of a bentonite clay; from about 0.1 to about 20 pounds per ton of said clay of a graft copolymer of acrylic acid and from about 0.1 to about 10% by weight, based on the weight of said acrylic acid, of a polyhydroxy polymeric compound having a molecular weight greater than about 250, or a salt of said graft copolymer; and from about 0.1 to about 20 pounds per ton of said clay of a water-soluble polyethylene oxide having a molecular weight of at least two and one-half million; said polymeric compound being of the group consisting of:
(a) derivatives of cellulose of the group consisting of chlorohydroxypropyl cellulose, phenylhydroxyethyl cellulose, hydroxybutyl cellulose, hydroxyethyl cellulose, ethyl cellulose, hydroxyethyl methyl cellulose, hydroxypropyl methyl cellulose, and carboxymethyl cellulose,
(b) starch,
(c) derivatives of starch of the group consisting of chlorohydroxypropyl starch, phenylhydroxyethyl starch, hydroxybutyl starch, hydroxyethyl starch, methyl starch, ethyl starch, hydroxyethyl methyl starch, hydroxypropyl methyl starch, and carboxymethyl starch,
(d) sugars,
(e) biochemically-synthesized heteropolysaccharides,
(f) polyvinyl alcohol,
(g) polyalkylene glycols, and
(h) alkoxy polyalkylene glycols.

9. A composition of matter in accordance with claim 8 containing from about 3 to about 10 pounds per ton of said clay of said graft copolymer or salt thereof and from about one to about 10 pounds per ton of said clay of a polyethylene oxide having a molecular weight of at least five million.

10. A composition of matter in accordance with claim 8 containing an alkali metal salt of a graft copolymer of acrylic acid and from about 0.25 to about 5% by weight, based on the weight of said acrylic acid, of a polyhydroxy polymeric compound of the group consisting of a derivative of cellulose and a biochemically-synthesized heteropolysaccharide.

11. An aqueous suspension consisting essentially of water, from about one to about 8% by weight of the suspension of a bentonite clay, from about 0.1 to about 20 pounds per ton of said clay of a water-soluble primary polymer which is a bentonite-beneficiating polymer of the group consisting of $C_2$–$C_4$ olefin-maleic anhydride copolymers, polyacrylates, and methyl vinyl ether-maleic anhydride copolymers, and from about 0.1 to about 20 pounds per ton of said clay of a water-soluble polyethylene oxide secondary polymer having a molecular weight of at least two and one-half million.

12. An aqueous suspension in accordance with claim 11 wherein said secondary polymer is a polyethylene oxide having a molecular weight of at least four million.

13. An aqueous suspension in accordance with claim 12 wherein said polyacrylate is produced by an emulsion polymerization of methyl acrylate to obtain a polymer which is then saponified.

14. An aqueous suspension in accordance with claim 12 wherein said clay is a sub-bentonitic clay treated with from about 0.5 to about 7% by weight, based on the weight of said clay, of soda ash.

15. An aqueous suspension in accordance with claim 12 containing from about 3 to about 10 pounds per ton of said clay of a polyacrylate as said primary polymer and from about one to about 10 pounds per ton of said clay of a polyethylene oxide having a molecular weight of at least five million as said secondary polymer.

16. An aqueous suspension consisting essentially of water; from about one to about 8% by weight of the suspension of a bentonite clay; from about 0.1 to about 20 pounds per ton of said clay of a water-soluble graft copolymer of acrylic acid and from about 0.1 to about 10% by weight, based on the weight of said acrylic acid, of a polyhydroxy polymeric compound, or a salt of said graft copolymer; and from about 0.1 to about 20 pounds per ton of said clay of a water-soluble polyethylene oxide having a molecular weight of at least two and one-half million; wherein said polymeric compound is of the group consisting of:
(a) derivatives of cellulose of the group consisting of chlorohydroxypropyl cellulose, phenylhydroxyethyl cellulose, hydroxybutyl cellulose, hydroxyethyl cellulose, ethyl cellulose, hydroxyethyl methyl cellulose, hydroxypropyl methyl cellulose, and carboxymethyl cellulose,
(b) starch,
(c) derivatives of starch of the group consisting of chlorohydroxypropyl starch, phenylhydroxyethyl starch, hydroxybutyl starch, hydroxyethyl starch, methyl starch, ethyl starch, hydroxyethyl methyl starch, hydroxypropyl methyl starch, and carboxymethyl starch,
(d) sugars,
(e) biochemically-synthesized heteropolysaccharides,
(f) polyvinyl alcohol,
(g) polyalkylene glycols, and
(h) alkoxy polyalkylene glycols.

17. An aqueous suspension in accordance with claim 16 containing from about 3 to about 10 pounds per ton of said clay of said graft copolymer or salt thereof and from about one to about 10 pounds per ton of said clay of a polyethylene oxide having a molecular weight of at least five million.

References Cited

UNITED STATES PATENTS

| | | | |
|---|---|---|---|
| 3,081,260 | 3/1963 | Park | 252—8.5 |
| 3,323,603 | 6/1967 | Lummus et al. | 252—8.5 X |
| 3,472,325 | 10/1969 | Lummus | 252—8.5 X |
| 3,020,231 | 2/1962 | Colwell et al. | 252—316 X |
| 3,272,749 | 9/1966 | Martin | 252—8.5 |
| 3,377,302 | 4/1968 | Gugliemelli et al. | 260—17.4 |
| 2,702,788 | 2/1955 | Dawson | 252—8.5 |
| 2,948,678 | 8/1960 | Turner et al. | 252—8.5 |
| 3,070,544 | 12/1962 | Johnson et al. | 252—8.5 |
| 3,095,391 | 6/1963 | Brockway et al. | 260—17.4 |

HERBERT B. GUYNN, Primary Examiner

U.S. Cl. X.R.

61—31; 252—8.5 C; 260—2 A, 17.4 GC, 874